United States Patent
Zheng et al.

(10) Patent No.: US 9,721,522 B2
(45) Date of Patent: Aug. 1, 2017

(54) ARRAY SUBSTRATE INCLUDING A CHARGE SHARING UNIT, DRIVING METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Dan Zheng, Beijing (CN); Jingxian Jin, Beijing (CN); Haibo Zhu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/419,366

(22) PCT Filed: Jul. 11, 2014

(86) PCT No.: PCT/CN2014/082042
§ 371 (c)(1),
(2) Date: Feb. 3, 2015

(87) PCT Pub. No.: WO2015/067064
PCT Pub. Date: May 14, 2015

(65) Prior Publication Data
US 2016/0035304 A1 Feb. 4, 2016

(30) Foreign Application Priority Data

Nov. 11, 2013 (CN) .......................... 2013 1 0556478

(51) Int. Cl.
*G09G 3/36* (2006.01)
*G02F 1/1345* (2006.01)
(Continued)

(52) U.S. Cl.
CPC ....... *G09G 3/3688* (2013.01); *G02F 1/13454* (2013.01); *G02F 1/136286* (2013.01);
(Continued)

(58) Field of Classification Search
CPC .................................................... G09G 3/3688
See application file for complete search history.

(56) References Cited

U.S. PATENT DOCUMENTS 7,061,464 B2 6/2006 Park et al.
2005/0024547 A1* 2/2005 Park .................. G02F 1/136213
349/39
(Continued)

FOREIGN PATENT DOCUMENTS

CN 1530919 A 9/2004
CN 1680995 A 10/2005
(Continued)

OTHER PUBLICATIONS

Second Chinese Office Action of Chinese Application No. 201310556478.8, mailed Nov. 3, 2015 with English translation.
(Continued)

*Primary Examiner* — Joseph Haley
*Assistant Examiner* — Karin Kiyabu
(74) *Attorney, Agent, or Firm* — Collard & Roe, P.C.

(57) ABSTRACT

An array substrate, a driving method thereof, and a display device are disclosed. The array substrate comprises a plurality of pixel units (11) defined by gate lines (110) and data lines (111) intersecting each other and a charge sharing unit (12). The charge sharing unit (12) is connected with at least two of the data lines (111). During a time period when a gate line (110) is not input with any scan signal for turning on pixel units (11), the charge sharing unit (12) electrically connects at least two data lines (111), to which it is connected, with each other. With this array substrate, the circuits
(Continued)

for realizing charge sharing function is disposed in the driving unit for driving the display to display, thereby reducing costs of the driving unit and facilitating panellization of the driving unit.

10 Claims, 4 Drawing Sheets

(51) Int. Cl.
 *G02F 1/1362* (2006.01)
 *G09G 3/00* (2006.01)
(52) U.S. Cl.
 CPC ........... *G09G 3/006* (2013.01); *G09G 3/3614* (2013.01); *G09G 3/3648* (2013.01); *G09G 2310/0248* (2013.01); *G09G 2310/0254* (2013.01); *G09G 2310/0291* (2013.01); *G09G 2310/08* (2013.01); *G09G 2330/023* (2013.01); *G09G 2330/12* (2013.01)

(56) References Cited

U.S. PATENT DOCUMENTS

| | | |
|---|---|---|
| 2005/0219195 A1 | 10/2005 | Yano et al. |
| 2006/0001631 A1 | 1/2006 | Yamazaki |
| 2007/0046613 A1 | 3/2007 | Ha et al. |
| 2007/0242019 A1 | 10/2007 | Jung et al. |
| 2008/0136806 A1 | 6/2008 | Lee et al. |
| 2012/0162165 A1* | 6/2012 | Lee .................. G09G 3/006 345/206 |

FOREIGN PATENT DOCUMENTS

| | | |
|---|---|---|
| CN | 1920624 A | 2/2007 |
| CN | 101059941 A | 10/2007 |
| CN | 101256986 A | 9/2008 |
| CN | 101324729 A | 12/2008 |
| CN | 101339338 A | 1/2009 |
| CN | 103543567 A | 1/2014 |
| JP | 2006-17802 A | 1/2006 |
| JP | 2013122968 A | 6/2013 |
| KR | 20110050056 A | 5/2011 |
| WO | 2009/003418 A1 | 1/2009 |

OTHER PUBLICATIONS

International Search Report and Written Opinion of the International Searching Authority with Notice of Transmittal of the International Search Report and Written Opinion of PCT/CN2014/084042 in Chinese, mailed Oct. 20, 2014.
Chinese Office Action of Chinese Application No. 201310556478.8, mailed Jul. 21, 2015 with English translation.
English translation of the International Preliminary Report on Patentability and Written Opinion of the International Searching Authority of PCT/CN2014/082042, issued May 17, 2016.

\* cited by examiner

ARRAY SUBSTRATE INCLUDING A CHARGE SHARING UNIT, DRIVING METHOD THEREOF, AND DISPLAY DEVICE

CROSS REFERENCE TO RELATED APPLICATIONS

This application is the National Stage of PCT/CN2014/082042 filed on Jul. 11, 2014, which claims priority under 35 U.S.C. §119 of Chinese Application No. 201310556478.8 filed on Nov. 11, 2013, the disclosure of which is incorporated by reference.

TECHNICAL FIELD

At least one embodiment of the present invention relates to an array substrate and a driving method thereof, and a display device.

BACKGROUND

Liquid crystal displays (LCDs) have been widely applied in electronic products such as notebook computers, flat TVs or mobile telephones due to their advantages of low radiation, small volume and low energy consumption.

Figure 1:
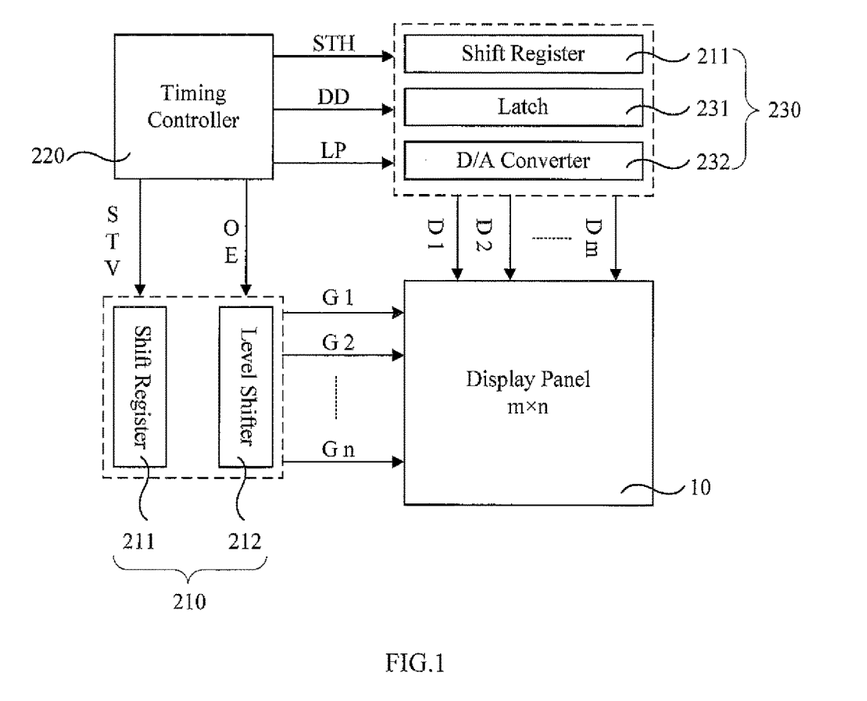
FIG. 1 is a schematic diagram of a display device.

A liquid crystal display generally has a structure as shown in FIG. 1. The liquid crystal display comprises a display panel 10 and a driving unit, which comprises a scan driver 210, a timing controller 220 and a data driver 230. The timing controller 220 outputs a vertical synchronizing signal STV and an enable signal OE to the scan driver 210, and a shift register 211 in the scan driver 210 shifts the received vertical synchronizing signal STV step by step to output a plurality of scan signals. A level shifter 212 receives scan signals and determines whether or not to output scan signals to the display panel 10 according to the enable signal OE. Referring to the waveform diagram of the enable signal OE and the gate row driving signal Gate in FIG. 2, when the OE signal is of low level, the Gate signals (G1, G2, G3, . . . ) are of low level; and when the OE signal is of high level, the Gate signals (G1, G2, G3, . . . ) are of high level. Coordinating the time sequence in which the scan driver 210 outputs scan signals, the timing controller 220 also outputs a horizontal synchronizing signal STH, a digital display data DD and a latch signal LP to the data driver 230, in which the horizontal synchronizing signal STH latches the digital display data DD in a corresponding channel in the latch 231, then determines whether or not to output the digital display data DD according to the latch signal LP, the digital display data DD is converted into display signals (D1, D2, . . . , Dm) by a digital to analog (D/A) converter 232 and input into the display panel 10 for image displaying.

Figure 2:
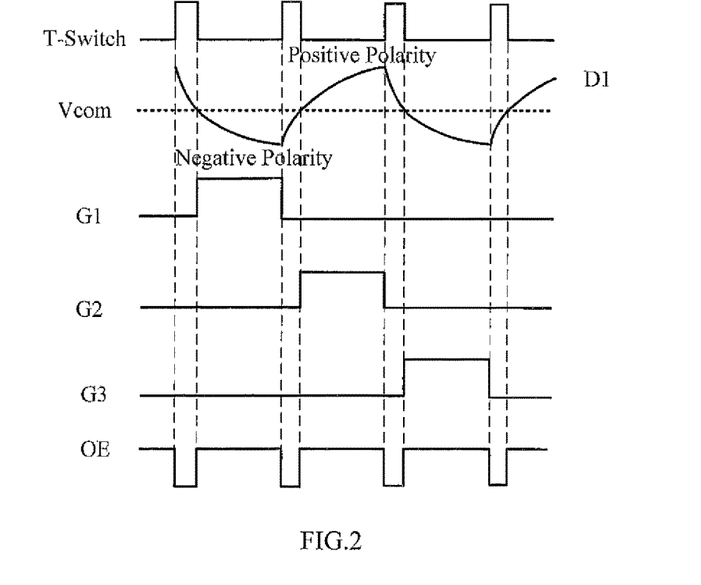
FIG. 2 is a sequence control diagram of an array substrate driving method.

In order to enhance the dynamic performance of a display panel 10, a polarity inversion technology is commonly used to drive the display panel 10. As shown in FIG. 2, during the enable period of the scan signal G1, the display signal D1 is of negative polarity with respect to the common voltage Vcom; during the enable period of the scan signal G2, the display signal D1 is of positive polarity with respect to the common voltage Vcom; and during the enable period of the scan signal G3, the display signal D1 is of negative polarity again with respect to the common voltage Vcom, and so forth. As such, the display signal D1 changes between the positive and negative polarities, and therefore the data driver 230 needs to consume much power. In order to reduce the oscillation amplitude of a signal output by the data driver 230 to save power consumption, a charge sharing technology may be applied.

Figure 3:
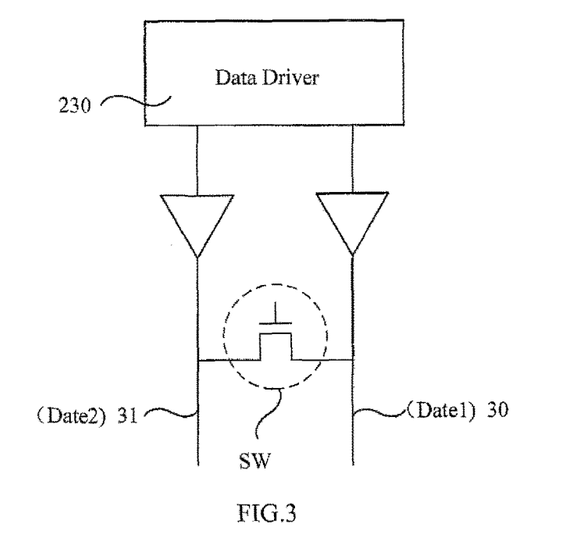
FIG. 3 is a charge sharing schematic diagram.

A charge sharing technology is to provide a switch SW between two channels, as shown in FIG. 3. A first data channel 30 (outputting display signal D1) and a second data channel 31 (outputting display signal D2) will be described herein as an example. Prior to the transition between positive and negative polarities of the display signal of the data channel, the first and second data channel 30 and 31 are shorted by turning on the control switch SW. As such, electrical charges on the first data channel 30 and the second data channel 31 may be equally distributed such that voltages on the first data channel 30 and the second data channel 31 rise or fall to about the common voltage Vcom beforehand (as shown in FIG. 2 by the display signal D1). Therefore, the data driver 230 only needs to discharge voltages on data channels to a negative polarity voltage around the common voltage Vcom or charge them to a positive polarity voltage such that it is possible to reduce the oscillation amplitude of the display signal output by the data driver 230, thereby saving much power consumption caused by polarity inversion.

SUMMARY

At least one embodiment of the present invention provides an array substrate and a driving method thereof, and a display device for reducing costs of driving units, facilitating panellization of driving units.

At least one embodiment of the present invention provides an array substrate comprising: a plurality of pixel units defined by gate lines and data lines intersecting each other, and a charge sharing unit. The gate lines are configured to input scan signals for turning on the pixel units, the charge sharing unit is configured to connects at least two of the data lines for electrically connecting the at least two of the data lines, to which the charge sharing unit is connected, with each other during a time period when the gate lines are not input with a scan signal.

At least one embodiment of the present invention provides a display device comprising an array substrate as described above.

At least one embodiment of the present invention provides a driving method for an array substrate comprising a plurality of pixel units defined by gate lines and data lines intersecting each other and a charge sharing unit; and the method comprises: electrically connecting, by the charge sharing unit, at least two of the data lines to which it is connected with each other when the gate lines are not input with a scan signal.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

10—display panel; 11—pixel unit; 110—gate line; 111—data line; 12—charge sharing unit; 121—control switch; 122—charge sharing wire; 1201—thin film transistor; 123—data line test port; 123'—data signal test line; 124—gate line test port; 124'—gate signal test line; 13—driving unit; 210—scan driver; 211—displacement register; 212—level shifter; 220—timing controller; 230—data driver; 231—latch; 232—digital to analog converter; 30—first data channel; 31—second data channel.

DETAIL DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The inventors found that the circuit structure in driving unit needs to be modified to realize charge sharing with the structure of FIGS. 2 and 3, which accordingly would make the circuit structure of the driving unit more complex and is disadvantageous for panellization of driving unit, hence increasing production costs and reducing product quality.

Figure 4:
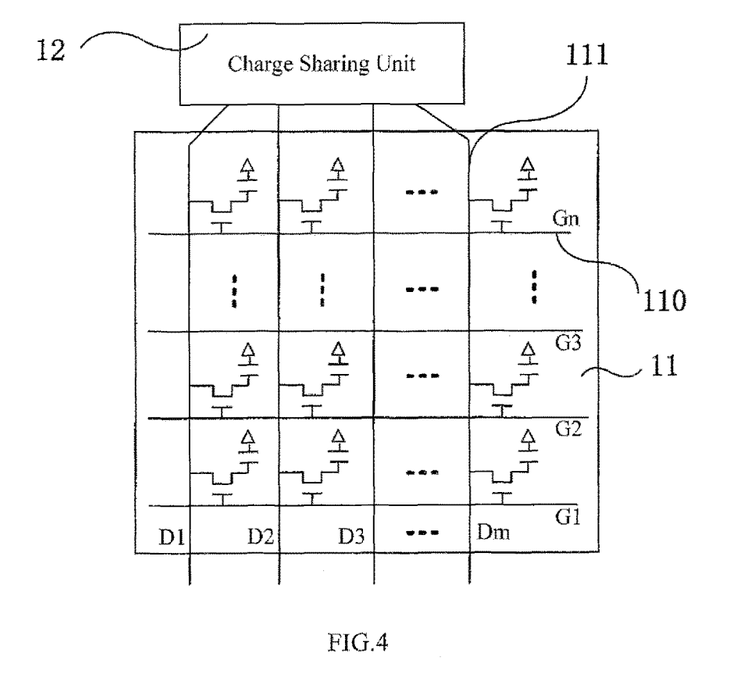
FIG. 4 is a structure diagram of an array substrate provided in an embodiment of the present invention.

At least one embodiment of the present invention provides an array substrate as shown in FIG. 4. The array substrate may comprise a plurality of pixel units 11 defined by gate lines 110 and data lines 111 intersecting each other, and the gate lines 110 are configured to input scan signals for turning on pixel units 11. The array substrate may further comprise a charge sharing unit 12.

The charge sharing unit 12 can connect with at least two data lines for electrically connecting the at least two data lines with each other during the time period when no scan signal is input into gate lines 110.

It is to be noted that gate lines 110 are configured to input scan signals for turning on the pixel units 11. For example, when a scan signal input by a gate line 110 in a row into the gate electrodes of TFTs in pixel units in this row is enabled, the TFTs in the pixel units in the corresponding row are turned on, that is, the source electrode and the drain electrode of each TFT are electrically conducted. In such a way, the data lines can be connected with the pixel electrodes in the corresponding pixel units and the data lines can input display data to pixel electrodes respectively to cause the display device to display.

It is to be noted that the scan signal, which is not input to a gate line, may be a scan signal for a row or a scan signal for a frame; that is, the gate line in every row is not input a scan signal, or the gate lines to be scanned in every frame are not input with a scan signal.

At least one embodiment of the present invention provides an array substrate. The array substrate comprises a plurality of pixel units defined by gate lines and data lines intersecting each other. By providing charge sharing units on the array substrate, during the time period when a gate line is not input with a scan signal for turning on pixel units, the charge sharing unit electrically connects at least two data lines, to which it is connected, with each other. In this way, it is not necessary to dispose circuits for charge sharing function in driving units for driving the display device to display, thereby reducing costs of driving units and facilitating panellization of driving units.

Figure 5:
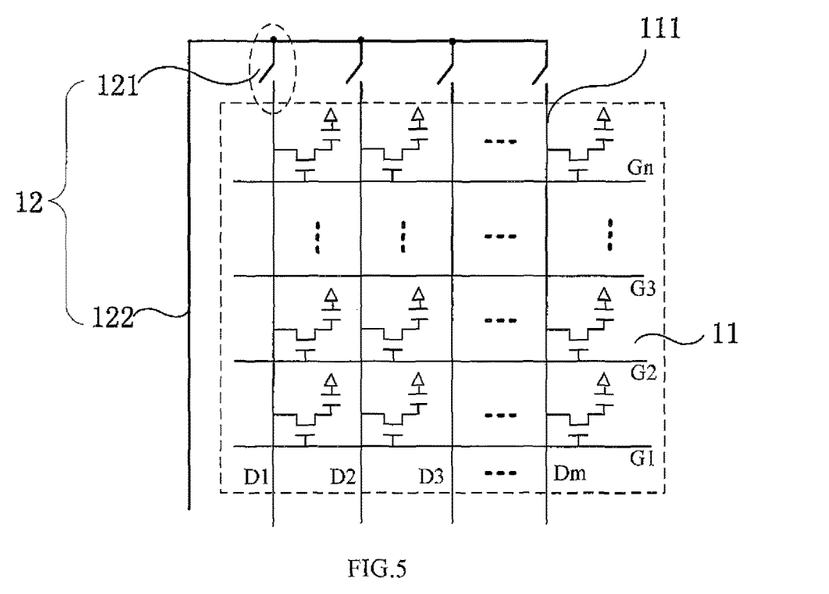
FIG. 5 is a structure diagram of another array substrate provided in another embodiment of the present invention.

For example, as shown in FIG. 5, the above-mentioned charge sharing unit 12 may comprise: a plurality of control switches 121 and a charge sharing wire 122; each control switch 121 has one end connected with a data line 111 and another end connected with the charge sharing wire 122.

When a control switch 121 is turned on, the corresponding data line 111 and the charge sharing wire 122 are electrically connected. For example, turning on the control switch 121 may means to control two ends of the control switch 121 to be connected. With a TFT as an example of the switch, when the scan signal input to a gate electrode of the TFT is enabled, the source electrode and the drain electrode of the TFT are electrically conducted, and the TFT is turned on. When the control switch 121 is turned on, two ends of the control switch 121 are connected, such that the data line 111 and the charge sharing wire, which are connected with two ends of the control switch 121, are electrically connected. In this way, all the data lines connected with the charge sharing wire 122 can be shorted such that electrical charges on data lines are equally distributed, hence realizing charge sharing. This therefore reduces oscillation amplitude of data signals output by data lines and thus saves power consumption of the display.

Figure 6:
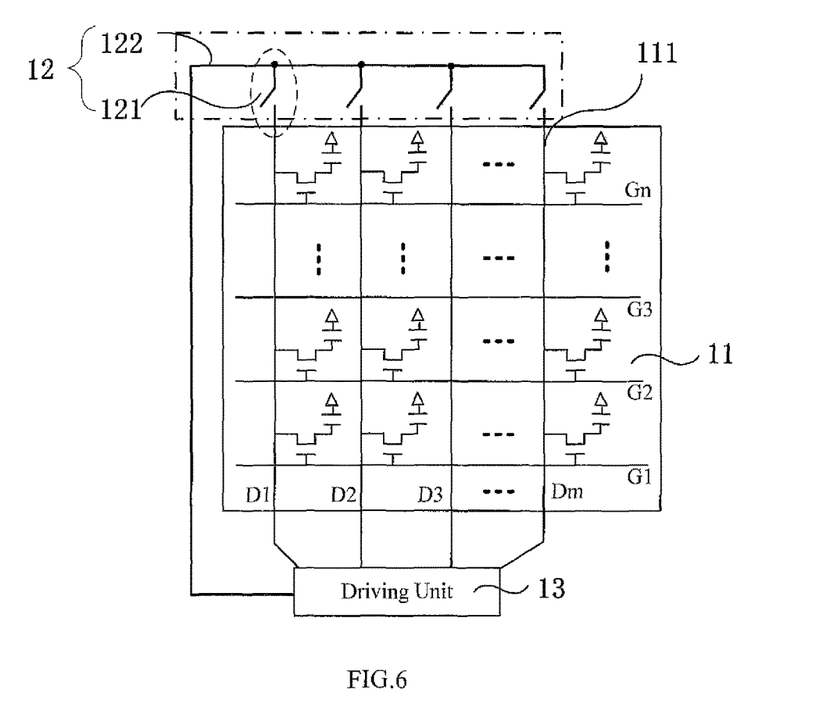
FIG. 6 is a structure diagram of another array substrate provided in another embodiment of the present invention.

For example, as shown in FIG. 6, in one embodiment, the array substrate may further comprise a driving unit 13. The driving unit 13 is connected to the charge sharing unit 12 to apply a control signal to control the charge sharing unit 12, such that at least two data lines 111 connected with the charge sharing unit 12 are electrically connected to each other. The driving unit 13 may further be connected with gate lines 110, which connection is not shown in the figure for simplicity.

The process of controlling the charge sharing unit 12 by the driving unit 13 is described below for example.

When the driving unit 13 does not drive a gate line 110 to output a scan signal for turning on pixels, the driving unit 13 inputs a signal to the charge sharing unit 12 to turn on control switches 121 such that data lines 111 and the charge sharing wire 122 connected with the control switches are electrically connected, thereby realizing charge sharing between data lines.

When the driving unit 13 drive a gate line 110 to output a scan signal for turning on pixel units, the driving unit 13 controls the charge sharing unit 12 to turn off the control switches 121 such that data lines 111 and the charge sharing wire 122 connected with the control switches are disconnected, thereby cutting off the charge sharing channels formed by the data lines 111 and the charge sharing wire 122.

In this way, in order to turn on the charge sharing function, it is not necessary to additionally provide a device for inputting signals to the charge sharing unit, which thereby simplifies the structure of the array substrate and reduces the production costs.

Figure 7:
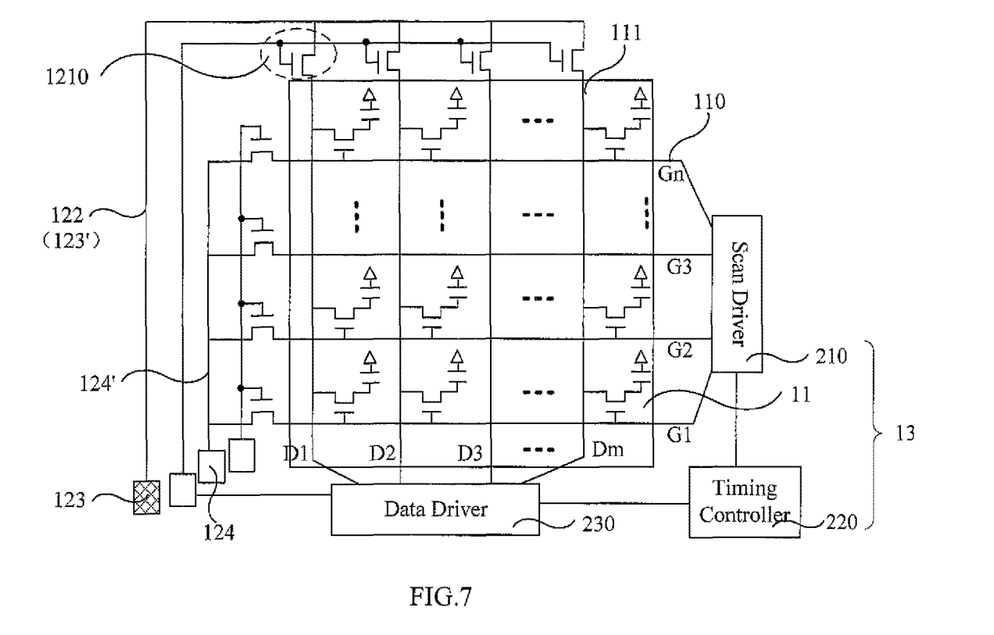
FIG. 7 is a structure diagram of another array substrate provided in yet another embodiment of the present invention.

In one embodiment, for example, the control switches 121 in the charge sharing unit 12 may comprise thin film transistors TFTs 1210 as shown in FIG. 7.

For example, the gate electrode of a TFT 1210 may be electrically connected with the driving unit with a first polar thereof being connected with a data line 111 and a second polar thereof being connected with the charge sharing wire 122, Since TFTs are widely applied in the related field, utilization of TFTs can reduce the difficulty of manufacturing circuits, and thereby saving manufacturing time and improving production efficiency. Of course, explanation is presented herein with only TFTs as an example of control switches. Other types of control switches will not be described herein, but should be within the scope of the present invention.

It is to be noted that in another embodiment, as shown in FIG. 7, the driving unit 13 may comprise a scan driver 210, a data driver 230 and a timing controller 220.

The scan driver 210 and the gate lines 110 are connected to output scan signals for controlling turning on and off the all pixels in the pixel circuit 11. The data driver 230 and data lines 111 are connected to output display signals. The timing controller 220 is connected with the scan driver 210 and the data driver 230 for outputting clock signals to the scan driver and the data driver to control the scan driver to output scan signals and control the data driver to output time sequence of display signals. For example, the timing controller 220 is configured to input an enable signals OE to the scan driver 210 to determine whether or not to output scan signals and input the latch signal LP to the data driver 230 to determine whether or not output a digital video data DD.

It is to be noted that the driving unit 13 in embodiments of the present invention may be implemented in the form of a driving integrated circuit (IC).

For example, the operation process of the driving unit 13 is described below. When the display is performing display, the data driver 230 may latch the digital display data DD and the clock signal timing sequence input by the timing controller 220, and convert them into display signals (as shown in FIG. 4 by D1, D2, D3 . . . Dm), then input them into data lines 111 of the display panel, the scan driver 210 can convert the input enable signal OE and the clock signal into voltages for controlling on/off of pixel units by the shift register 211 according to the timing controller 220, and apply them to the gate lines 110 of the display panel line by line.

In one embodiment, for example, one end of the charge sharing wire 122 is electrically connected with the data line test port 123; and when a test signal is input to the data line test port 123, the charge sharing wire 122 functions to test the data lines 111.

During the manufacturing process of the array substrate, gate lines 110 and data lines 111 formed on the array substrate need to be tested to avoid occurrence of poor line penetration. For example, when the test switch (TFT 1210 as shown in FIG. 7) is turned on, the data lines 111 and the data signal test lines 123' are conducted, and the gate lines 110 and the gate signal test lines 124' are conducted. In this way, by inputting test signals to the signal test line via the data line test port 123 and the gate line test port 124, it is possible to test gate lines 110 and data lines 111.

Because the data signal test line 123' is in an idle state after completing test on the data lines 111, it is possible to use the data signal test line 123' as the charge sharing wire 122. In this way, in the embodiment, it is not necessary to add another wire on the array substrate to realize a circuit with charge sharing function, thereby simplifying the structure of the array substrate and reducing the production costs.

At least one embodiment of the present invention provides a display device comprising any of the above mentioned array substrates. It has the same beneficial effects as that of the array substrate provided in any of the above embodiments of the present invention and will not be described any more herein since the array substrate has been described in detail in the above embodiments.

At least one embodiment of the present invention provides a display device. The display device comprises an array substrate comprising a plurality of pixel units defined by gate lines and data lines intersecting each other. By providing charge sharing units on the array substrate, during the time period when a gate line is not input with a scan signal for turning on pixel units, the charge sharing unit electrically connects at least two data lines, to which it is connected, with each other. In this way, it is not necessary to dispose circuits for charge sharing function in driving units for driving the display to display, thereby reducing costs of driving units and facilitating panellization of driving units.

One example of the display device is a liquid crystal display device comprising an array substrate and an opposed substrate disposed opposite to each other to form a liquid crystal cell in which liquid crystal material is filled. The opposed substrate is for example a color filter substrate.

At least one embodiment of the present invention provides a driving method for an array substrate as shown in FIG. 4. The array substrate comprises a plurality of pixel units 11 defined by gate lines 110 and data lines 111 intersecting each other, the gate lines 110 are configured to input scan signals for turning on pixel units 11. The array substrate may further comprise a charge sharing unit 12. The method is described below.

During the time period when a gate line 110 is not input any scan signal, the charge sharing unit 12 electrically connects at least two data lines 111 to which it is connected.

It is to be noted that the scan signal, which is not input to a gate line, may be for example a scan signal for a row or a scan signal for a frame; that is, the gate line in every row is not input a scan signal, or the gate lines to be scanned in every frame are not input with a scan signal.

At least one embodiment of the present invention provides a driving method for an array substrate. The array substrate comprises a plurality of pixel units defined by gate lines and data lines intersecting each other. By providing a charge sharing unit on the array substrate, during the time period when a gate line is not input with a scan signal for turning on pixel units, the charge sharing unit electrically connect at least two data lines, to which it is connected, with each other. In this way, it is not necessary to dispose circuits for charge sharing function in driving units for driving the display to display, thereby reducing costs of driving units and facilitating panellization of driving units.

For example, as shown in FIG. 5, the charge sharing unit 12 may comprise a plurality of control switches 121 and a charge sharing wire 122; each control switch 121 has one end connected with a data line 111 and another end connected with the charge sharing wire 122. The method may be as described below.

During the time period when a gate line 110 is not input with any scan signal, a control switch 121 is turned on to electrically connect the data line 111 and the charge sharing wire 122, to which the control switch 121, are connected. In this way, all data lines connected with the charge sharing wire 122 are shorted such that electrical charges on data lines are equally distributed, hence realizing charge sharing. This therefore reduces oscillation amplitude of data signals output by data lines and thus saves power consumption of the display.

For example, in one embodiment, the array substrate may further comprise a driving unit 13. The driving method may further comprise: controlling the charge sharing unit 12 by the driving unit 13 to electrically connect at least two data lines 111, to which the charge sharing unit 12 is connected. For example, during the time period when the driving unit 13 does not drive a gate line 110 to output scan signal for turning on pixel units, the driving unit 13 inputs signals to the charge sharing unit 12 to turn on the control switch 121 such that the data lines 111 and a charge sharing wire 122 connected with the control switch are connected, thereby realizing charge sharing between data lines. In this way, in order to realize the charge sharing function, it is not necessary to additionally provide a device for inputting signals to the charge sharing unit, which thereby simplifies the structure of the array substrate and reduces the production costs.

In one embodiment, for example, the charge sharing wire 122 has one end electrically connected with the test port for the data lines 111. The driving method may further comprise: inputting a test signal to the charge sharing wire 122 to test the data lines 111. As shown in FIG. 7, when the test switch (TFTs 1210 as shown in the figure) is turned on, the data lines 111 and the data signal test lines 123' are conducted, and the gate lines 110 and the gate signal test lines 124' are conducted. In this way, by inputting test signals to the signal test line via the data line test port 123 and the gate line test port 124, it is possible to test the gate lines 110 and the data lines 111.

Since the data signal test line 123' is in an idle state after completing test on the data lines 111, it is possible to use the data signal test line 123' as the charge sharing wire 122. In this way, in the embodiment, it is not necessary to add other wires on the array substrate to realize a circuit with charge sharing function, thereby simplifying the structure of the array substrate and reducing the production costs.

Those of ordinary skill in the art should understand that some or all steps for implementing the above-mentioned method embodiment may be accomplished by hardware related to program instructions, the aforementioned program may be stored in a computer readable storage medium while being executed, carries out steps comprising the above-mentioned method embodiment; while the aforementioned storage media comprises media that can store program codes such as ROMs, RAMs, magnetic disks or optical disks.

What are described above is related to the illustrative embodiments of the disclosure only and not limitative to the scope of the disclosure; the scopes of the disclosure are defined by the accompanying claims.

The present application claims priority of the China patent application No. 201310556478.8 filed on Nov. 11, 2013, the disclosure of which is incorporated by reference herein in its entirety as part of the present application by reference.

The invention claimed is:
1. An array substrate comprising:
   a plurality of pixel units defined by gate lines and data lines intersecting each other, and
   a charge sharing unit;
   wherein the gate lines are configured to input a scan signal for turning on the pixel units, the charge sharing unit comprises a plurality of control switches and a charge sharing wire, each of the control switches has one end connected with one of the data lines and another end connected with the charge sharing wire, the charge sharing wire connects at least two of the data lines;
   under a test mode, the charge sharing wire has one end electrically connected with a data line test port and the charge sharing wire is used to test the corresponding data line when a test signal is inputted via the data line test port; and
   under a display mode, the charge sharing wire electrically connects the at least two of the data lines in response to turning on the corresponding control switches when the gate lines are not inputted with a scan signal.
2. The array substrate of claim 1, further comprising a driving unit;
   wherein the driving unit and the charge sharing unit are connected to control the charge sharing unit to electrically connect the at least two of the data lines, to which the charge sharing unit is connected, with each other.
3. The array substrate of claim 2, wherein the control switches comprise thin film transistors;
   a gate electrode of each of the thin film transistors is electrically connected with the driving unit with its first polar being connected with one of the data lines and a second polar being connected with the charge sharing wire.
4. The array substrate of claim 2, wherein the driving unit comprises:
   a scan driver, the scan driver and the gate lines being connected to output scan signals for controlling turning-on and -off all pixel units,
   a data driver, the data driver and the data lines being connected to output display signals;
   a timing controller, the timing controller being connected with the scan driver and the data driver for controlling a time sequence in which the scan driver outputs scan signals and the data driver outputs display signals.
5. A display device comprising an array substrate of claim 1.
6. A driving method for an array substrate comprising a plurality of pixel units defined by gate lines and data lines intersecting each other and a charge sharing unit;
   wherein the charge sharing unit comprises a plurality of control switches and a charge sharing wire, wherein each of the control switches has one end connected with one of the data lines and another end connected with the charge sharing wire, and the charge sharing wire connects at least two of the data lines,
   the method comprising:
   under a test mode, the charge sharing wire has one end electrically connected with a data line test port, and a test signal is inputted to the charge sharing wire via the data line test port,
   after completion of the test on the data line, under a display mode, the charge sharing wire electrically connects the at least two of the data lines in response to turning on the corresponding control switches when the gate lines are not inputted with a scan signal.
7. The driving method of claim 6, wherein the array substrate further comprises a driving unit,
   the method comprises controlling the charge sharing unit, by the driving unit, to electrically connect the at least two of the data lines, to which the charge sharing unit is connected, with each other.
8. The array substrate of claim 3, wherein the driving unit comprises:

a scan driver, the scan driver and the gate lines being connected to output scan signals for controlling turning-on and -off all pixel units, a data driver, the data driver and the data lines being connected to output display signals;

a timing controller, the timing controller being connected with the scan driver and the data driver for controlling a time sequence in which the scan driver outputs scan signals and the data driver outputs display signals.

9. The array substrate of claim 1, wherein the charge sharing unit has one charge sharing wire.

10. The method of claim 6, wherein the charge sharing unit has one charge sharing wire.

* * * * *